United States Patent

Gao (10) Patent No.: US 10,182,340 B2
(45) Date of Patent: Jan. 15, 2019

(54) PROFILE SWITCHING METHOD AND TERMINAL

(71) Applicant: Huawei Technologies Co., Ltd., Shenzhen (CN)

(72) Inventor: Linyi Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/765,080

(22) PCT Filed: Sep. 30, 2015

(86) PCT No.: PCT/CN2015/091219
§ 371 (c)(1),
(2) Date: Mar. 30, 2018

(87) PCT Pub. No.: WO2017/054172
PCT Pub. Date: Apr. 6, 2017

(65) Prior Publication Data
US 2018/0288606 A1  Oct. 4, 2018

(51) Int. Cl.
*H04B 1/38* (2015.01)
*H04M 1/00* (2006.01)
(Continued)

(52) U.S. Cl.
CPC ............ *H04W 8/183* (2013.01); *H04W 88/06* (2013.01)

(58) Field of Classification Search
CPC ......... H04B 1/38; H04B 1/3816; H04W 4/60; H04W 8/18; H04W 8/20; H04W 8/265; H04M 1/66; H04L 9/006; H04L 63/06
(Continued)

(56) References Cited

U.S. PATENT DOCUMENTS 8,577,337 B2 * 11/2013 O'Leary ............... H04W 8/22
455/410
9,100,185 B2 * 8/2015 Yasuda ............... H04L 9/008
(Continued)

FOREIGN PATENT DOCUMENTS

CN    101257674 A    9/2008
CN    102158934 A    8/2011
(Continued)

OTHER PUBLICATIONS

Machine Translation and Abstract of Chinese Publication No. CN101257674, Sep. 3, 2008, 8 pages.
(Continued)

*Primary Examiner* — Quochien B Vuong
(74) *Attorney, Agent, or Firm* — Conley Rose, P.C.

(57) ABSTRACT

A profile switching method and a terminal, where the method includes sending, by a terminal, an enable instruction to an embedded universal integrated circuit card (eUICC), where the eUICC includes at least a first profile and a second profile, the terminal has accessed a network using the first profile, data of the first profile is stored in a cache of the terminal, and the enable instruction instructs the eUICC to disable the first profile and enable the second profile, and send a first instruction to the terminal, where the first instruction instructs the terminal not to restart the eUICC, and after receiving the first instruction, retaining, by the terminal, the data of the first profile in the cache, storing data of the second profile in the cache, and accessing a network using the second profile.

20 Claims, 8 Drawing Sheets

(51) Int. Cl.
*H04W 8/18* (2009.01)
*H04W 88/06* (2009.01)

(58) Field of Classification Search
USPC .................................. 455/414.1, 418, 558
See application file for complete search history.

(56) References Cited

U.S. PATENT DOCUMENTS

| | | | |
|---|---|---|---|
| 9,712,996 B2* | 7/2017 | Park | ........................ H04L 67/303 |
| 2005/0186977 A1* | 8/2005 | Chiu | ........................ H04W 8/18 |
| | | | 455/466 |
| 2015/0105080 A1 | 4/2015 | Jin | |
| 2016/0021529 A1* | 1/2016 | Park | ........................ H04W 12/08 |
| | | | 455/410 |
| 2017/0222991 A1* | 8/2017 | Yang | ........................ H04L 9/006 |

FOREIGN PATENT DOCUMENTS

| | | |
|---|---|---|
| CN | 103167576 A | 6/2013 |
| CN | 103634791 A | 3/2014 |
| EP | 2835996 A1 | 2/2015 |

OTHER PUBLICATIONS

Machine Translation and Abstract of Chinese Publication No. CN102158934, Aug. 17, 2011, 23 pages.
Machine Translation and Abstract of Chinese Publication No. CN103167576, Jun. 19, 2013, 10 pages.
Orange et al.,"Requirements for a local management of the profiles hosted in the embedded SIM by the end user," Tdoc SCPREQ(15)000007r4,ETSI TC SCP REQ Meeting #49, Feb. 9-13, 2015, 7 pages.
Foreign Communication From a Counterpart Application, PCT Application No. PCT/CN2015/091219, English Translation of International Search Report dated Jun. 22, 2016, 2 pages.
Foreign Communication From a Counterpart Application, PCT Application No. PCT/CN2015/091219, English Translation of Written Opinion dated Jun. 22, 2016, 5 pages.

* cited by examiner

PROFILE SWITCHING METHOD AND TERMINAL

CROSS-REFERENCE TO RELATED APPLICATIONS

This application is a U.S. National Stage of International Patent Application No. PCT/CN2015/091219 filed on Sep. 30, 2015, which is hereby incorporated by reference in its entirety.

TECHNICAL FIELD

The present disclosure relates to the communications field, and in particular, to a user profile switching method and a terminal.

BACKGROUND

With rapid development of the Internet of Things, to manage subscription over the Internet of Things more effectively to configure an Internet of Things terminal more flexibly and effectively, and especially to meet a special requirement of a specific application scenario and operating environment, the international standards organization Global System for Mobile Communications Association (GSMA) puts forward a demand for an embedded universal integrated circuit card (eUICC). An eUICC may be applied to a terminal closely related to people, such as a smartphone, a tablet computer, or a wearable device, to better satisfy a special requirement of people on a new smart card and a need of terminals to develop towards higher integration.

Generally, at least one user profile is installed in an eUICC. In other approaches, an eUICC supports only one enabled profile. Therefore, only one network can be accessed at a time. In view of this, to use one eUICC to implement functions of two universal integrated circuit cards (UICCs), one solution is to implement a dual card function by flexible and quick switching between two profiles.

In the other approaches, however, when the eUICC performs a profile switch, the terminal deletes data of an originally enabled profile from a cache of the terminal, re-initializes the eUICC, reads data of a newly enabled profile, and stores the data in the cache. In such a profile switch process, an eUICC platform first needs to be re-initialized. That is, the eUICC is first powered off and then powered on again, a voltage class supported by the eUICC is matched, and a communications protocol is re-negotiated, among other actions. Then, a network is accessed using the newly enabled profile, and a complete network authentication process is completed. This authentication process usually consumes a relatively long time. Therefore, a service interruption, a service loss (for example, missing a phone call), or the like is to occur in the entire profile switch process, and user experience is relatively poor.

SUMMARY

The present disclosure provides a profile switching method and a terminal, to implement flexible and quick switching between a plurality of profiles, and thereby implement a single card dual standby function.

According to a first aspect, an embodiment of the present disclosure provides a user profile switching method, where the method includes sending, by a terminal, an enable instruction to an eUICC, where the eUICC includes at least a first profile and a second profile, data of the first profile is stored in a cache of the terminal, the terminal has accessed a network using the first profile, and the enable instruction is used to instruct the eUICC to disable the first profile and enable the second profile, receiving, by the terminal, a first instruction sent by the eUICC, where the first instruction is a response of the eUICC to the enable instruction, and is used to instruct the terminal not to restart the eUICC, according to the first instruction, retaining, by the terminal, the data of the first profile stored in the cache, and storing data of the second profile in the cache, and accessing, by the terminal, a network using the second profile.

With reference to the first aspect, in a first possible implementation of the first aspect, the method further includes sending, by the terminal, a profile switch command to the eUICC such that the eUICC disables the second profile and enables the first profile, and receiving, by the terminal, a profile switch successful message sent by the eUICC.

With reference to the first possible implementation of the first aspect, in a second possible implementation of the first aspect, sending, by the terminal, a profile switch command to the eUICC includes sending, by the terminal, the profile switch command to the eUICC when the terminal receives a request to connect the first profile.

With reference to the second possible implementation of the first aspect, in a third possible implementation of the first aspect, sending, by the terminal, a profile switch command to the eUICC includes sending, by the terminal, the profile switch command to the eUICC, when the terminal receives the request to connect the first profile and no service interacting with the second profile is currently going on.

With reference to the first possible implementation of the first aspect, in a fourth possible implementation of the first aspect, the method further includes starting, by the terminal, a profile switch timer, sending, by the terminal, a profile switch command to the eUICC includes sending, by the terminal, the profile switch command to the eUICC when the profile switch timer expires, and after receiving, by the terminal, a profile switch successful message sent by the eUICC, the method further includes restarting, by the terminal, the profile switch timer.

With reference to any one of the first aspect, or the first possible implementation of the first aspect to the fourth possible implementation of the first aspect, in a fifth possible implementation of the first aspect, the method further includes receiving, by the terminal, an answer to reset (ATR) message sent by the eUICC, where the ATR message includes a first indication parameter, and sending, by a terminal, an enable instruction to an eUICC includes sending, by the terminal, the profile enable instruction to the eUICC according to the first indication parameter.

With reference to any one of the first aspect, or the first possible implementation of the first aspect to the fourth possible implementation of the first aspect, in a sixth possible implementation of the first aspect, the profile enable instruction is a set status command or a store data command, and the profile enable instruction includes a second indication parameter, where the second indication parameter is used to cause the eUICC to send, according to the second indication parameter, the first instruction to the terminal.

With reference to the fourth possible implementation of the first aspect, in a seventh possible implementation of the first aspect, the method further includes receiving, by the terminal, an instruction to deactivate a first target profile, where one of the first profile or the second profile is the first target profile, detaching, by the terminal, from a network to which the first target profile belongs, and stopping, by the terminal, the profile switch timer.

With reference to the fourth possible implementation of the first aspect, in an eighth possible implementation of the first aspect, the method further includes receiving, by the terminal, an instruction to delete a second target profile, where one of the first profile or the second profile is the second target profile, detaching, by the terminal, from a network to which the second target profile belongs, stopping, by the terminal, the profile switch timer, sending, by the terminal, an instruction to delete the second target profile to the eUICC such that the eUICC deletes the second target profile, and deleting, by the terminal, data of the second target profile from the cache.

According to a second aspect, an embodiment of the present disclosure provides a user profile switching method, where the method is applied to an eUICC, the eUICC includes at least a first profile and a second profile, data of the first profile is stored in a cache of a terminal, the terminal has accessed a network using the first profile, and the method includes receiving, by the eUICC, an enable instruction sent by the terminal, disabling, by the eUICC, the first profile and enabling the second profile according to the enable instruction, and sending, by the eUICC, a first instruction to the terminal according to the enable instruction, where the first instruction is used to instruct the terminal not to restart the eUICC, retain the data of the first profile stored in the cache, and store data of the second profile in the cache of the terminal in order to access a network using the second profile.

With reference to the second aspect, in a first possible implementation of the second aspect, the method further includes receiving, by the eUICC, a profile switch command sent by the terminal, disabling, by the eUICC, the second profile and enabling the first profile, and sending, by the eUICC, a profile switch successful message to the terminal.

With reference to the second aspect or the first possible implementation of the second aspect, in a second possible implementation of the second aspect, the method further includes sending, by the eUICC, an ATR message to the terminal, where the ATR message includes a first indication parameter such that the terminal sends the profile enable instruction to the eUICC according to the first indication parameter.

With reference to the second aspect or the first possible implementation of the second aspect, in a third possible implementation of the second aspect, the profile enable instruction is a set status or store data command, and the profile enable instruction includes a second indication parameter, and sending, by the eUICC, a first instruction to the terminal according to the enable instruction includes sending, by the eUICC, the first instruction to the terminal according to the second indication parameter.

According to a third aspect, an embodiment of the present disclosure provides a terminal, where the terminal includes a processor, an eUICC, and a cache, where the eUICC includes at least a first profile and a second profile, data of the first profile is stored in the cache, and the terminal has accessed a network using the first profile, the processor is configured to send an enable instruction to the eUICC, the eUICC is configured to disable the first profile and enable the second profile according to the enable instruction, and send a first instruction to the processor, where the first instruction is used to instruct the processor not to restart the eUICC, and the processor is further configured to according to the first instruction, retain the data of the first profile stored in the cache, and store data of the second profile in the cache such that the terminal accesses a network using the second profile.

With reference to the third aspect, in a first possible implementation of the third aspect, the processor is further configured to send a profile switch command to the eUICC, and the eUICC is further configured to disable the second profile and enable the first profile after receiving the profile switch command, and send a profile switch successful message to the processor.

With reference to the first possible implementation of the third aspect, in a second possible implementation of the third aspect, the processor is further configured to send the profile switch command to the eUICC when receiving a request to connect the first profile.

With reference to the second possible implementation of the third aspect, in a third possible implementation of the third aspect, the processor is further configured to send the profile switch command to the eUICC, when receiving the request to connect the first profile and no service interacting with the second profile is currently going on.

With reference to the first possible implementation of the third aspect, in a fourth possible implementation of the third aspect, the processor is further configured to start a profile switch timer, the processor is further configured to send the profile switch command to the eUICC when the profile switch timer expires, and the processor is further configured to restart the profile switch timer after receiving the profile switch successful message.

With reference to any one of the third aspect, or the first possible implementation of the third aspect to the fourth possible implementation of the third aspect, in a fifth possible implementation of the third aspect, the eUICC is further configured to send an ATR message to the processor, where the ATR message includes a first indication parameter, and the processor is further configured to send the profile enable instruction to the eUICC according to the first indication parameter.

With reference to any one of the third aspect, or the first possible implementation of the third aspect to the fourth possible implementation of the third aspect, in a sixth possible implementation of the third aspect, the processor is further configured to send the profile enable instruction to the eUICC, where the profile enable instruction is a set status command or a store data command, and the profile enable instruction includes a second indication parameter, and the eUICC is further configured to send the first instruction to the processor according to the second indication parameter.

With reference to the fourth possible implementation of the third aspect, in a seventh possible implementation of the third aspect, the processor is further configured to receive an instruction to deactivate a first target profile, detach the terminal from a network to which the first target profile belongs, and stop the profile switch timer, where the first target profile is one of the first profile or the second profile.

With reference to the fourth possible implementation of the third aspect, in an eighth possible implementation of the third aspect, the processor is further configured to receive an instruction to delete a second target profile, detach the terminal from a network to which the second target profile belongs, stop the profile switch timer, and send an instruction to delete the second target profile to the eUICC, where the second target profile is one of the first profile or the second profile, the eUICC is further configured to delete the second target profile after receiving the instruction sent by the processor to delete the second target profile, and the processor is further configured to delete data of the second target profile from the cache.

It can be learned from the foregoing technical solutions that the solutions of the embodiments of the present disclosure have the following beneficial effects.

In the embodiments of the present disclosure, the eUICC includes at least the first profile and the second profile, the terminal has accessed the network using the first profile, and the data of the first profile is stored in the cache of the terminal. The terminal sends the enable instruction to the eUICC, where the enable instruction is used to instruct the eUICC to disable the first profile and enable the second profile, and send the first instruction to the terminal, where the first instruction instructs the terminal that the eUICC does not need to be restarted. After receiving the first instruction sent by the eUICC, the terminal retains the data of the first profile stored in the cache, stores the data of the second profile in the cache, and accesses the network using the second profile. In the embodiments of the present disclosure, an eUICC initialization process is optimized such that the terminal does not restart the eUICC after a profile switch, but still retains data of a before-switching profile and camps, using this data, on a network to which the before-switching profile belongs, and may also access a network using an after-switching profile. In this way, quick switching between profiles can be implemented, and a single card dual standby effect can be achieved.

DESCRIPTION OF EMBODIMENTS

The following clearly describes technical solutions in the embodiments of the present disclosure with reference to the accompanying drawings in the embodiments of the present disclosure. The described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, terms "first," "second," "third," "fourth," and the like (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. In addition, terms "include," "have," and any variations thereof are intended to cover non-exclusive inclusion. For example, a process, method, system, product, or device that includes a series of steps or units is not necessarily limited to the explicitly listed steps or units, but may include another step or unit that is not explicitly listed or that is inherent to the process, method, product, or device.

The present disclosure provides a profile switching method, a terminal, and an eUICC to implement flexible and quick switching between a plurality of profiles, and thereby implement a single card dual standby function. Details are described below.

The embodiments of the present disclosure mainly involve several network elements a terminal (or device), an eUICC, and a mobile network operator (MNO).

The terminal in the embodiments of the present disclosure may be a smartphone, a tablet computer, an Internet of Things terminal device, or a terminal device such as a handheld device with a wireless communication function, an in-vehicle device, a wearable device, or a computing device.

The eUICC in the embodiments of the present disclosure usually exists in a form of being embedded in a terminal by means of packaging or welding. In this manner, it is inconvenient to insert the eUICC into or remove the eUICC from the terminal. In addition, the eUICC may alternatively exist, like a UICC, in a form of being free to be inserted or removed, instead of being embedded in a terminal. A specific existence form of the eUICC in a terminal is not limited herein.

The eUICC in the embodiments of the present disclosure includes at least two profiles. Further, a profile is a set of a file structure, data, an application program, and the like, and may include one or more network access applications (NAAs) and a corresponding network access credential, for example, an international mobile subscriber identity (IMSI), a key identity (KI), or the like. When the terminal is deployed in a position inconvenient for manual insertion or replacement of a card, a user may configure the eUICC remotely, for example, remotely download, enable, disable, or delete a profile in the eUICC, to implement flexible management of the smart card.

Figure 1:
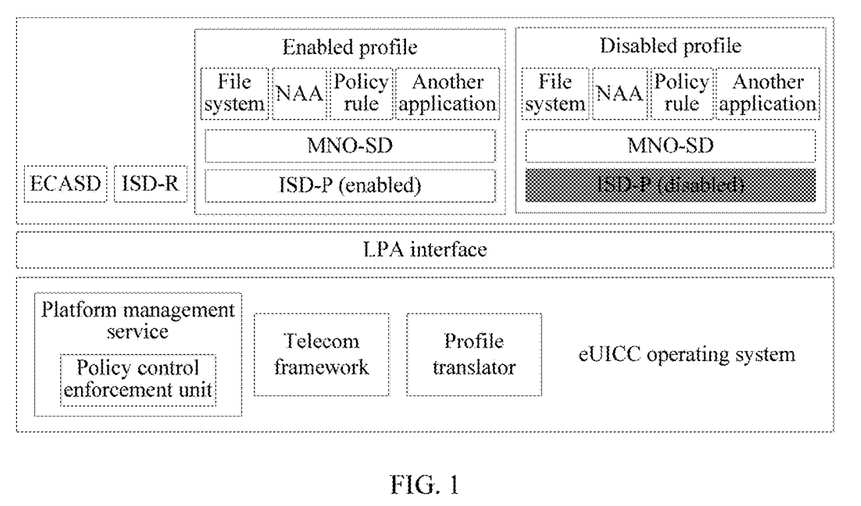
FIG. 1 is a schematic diagram of a logical architecture of an eUICC according to an embodiment of the present disclosure.

FIG. 1 is a schematic diagram of a logical architecture of an eUICC. As shown in FIG. 1, the eUICC includes an eUICC controlling authority security domain (ECASD), an issuer security domain root (ISD-R), an issuer security domain profile (ISD-P), profiles, a Local Profile Assistant (LPA) service, and an eUICC operating system.

The ECASD stores a key and a certificate of the eUICC.

The ISD-R is associated with a subscription manager-secure routing (SM-SR) (not shown) outside the eUICC, and is used for establishing a secure communication channel with the SM-SR and creating a new ISD-P.

The ISD-P, also referred to as a profile domain, is space for storing a profile, stores a key used for secure communication with a subscription manager-datapreparing (SM-DP) (not shown) outside the eUICC, and is used for decrypting and installing a credential of a profile.

It should be noted that the SM-SR and the SM-DP in the embodiments of the present disclosure may be two logical entities, two physical entities, one logical entity, or one physical entity. This is not limited in the present disclosure.

Profiles: FIG. 1 shows two profiles. One is an enabled profile, and one is a disabled profile. Each profile further includes a file system, an NAA, a policy rule, another application, and a mobile network operator security domain (MNO-SD).

LPA service: An LPA is a module that is in the terminal and that manages the profiles in the eUICC, and the terminal manages the profiles using the LPA service in the eUICC.

The eUICC operating system includes a platform service manager and a telecom framework. The platform service manager is configured to provide a platform management function and a policy rule enforcement mechanism. The telecom framework is configured to provide a standardized network authorization algorithm for the NAA, and is also capable of configuring an algorithm using a requirement parameter.

It should be noted that the logical architecture shown in FIG. 1 is merely a schematic diagram of the eUICC, and does not necessarily represent an actual logical structure of the eUICC. The actual logical structure may be different in practical application.

Figure 2:
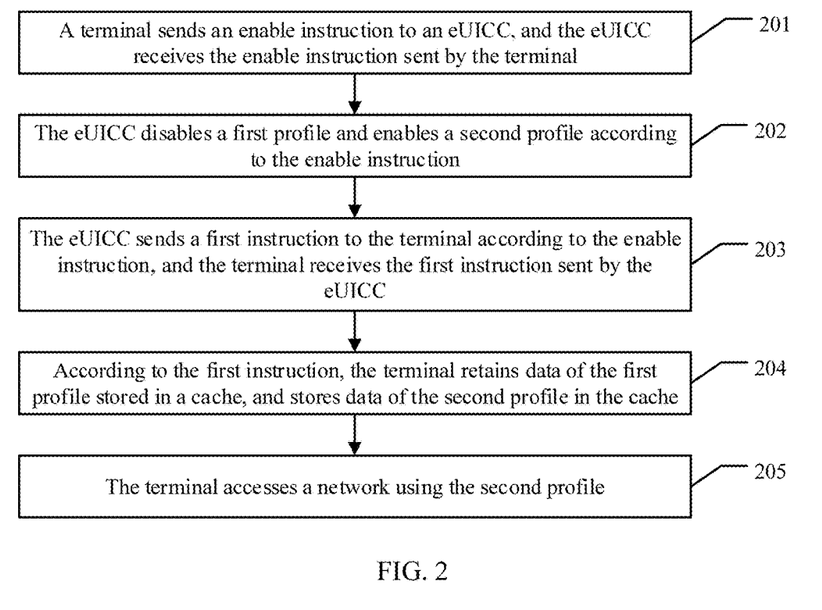
FIG. 2 is a flowchart of a profile switching method according to an embodiment of the present disclosure.

With reference to FIG. 2, a profile switching method provided in an embodiment of the present disclosure includes the following steps.

Step 201: A terminal sends an enable instruction to an eUICC, and the eUICC receives the enable instruction sent by the terminal.

The terminal initiates an eUICC initialization process upon startup. The terminal powers on pins of the UICC in sequence, supplies power to the eUICC based on a lowest voltage class (for example, 1.8 Volts (V)), matches a voltage class supported by the eUICC, and negotiates a communications protocol, among other actions.

The eUICC includes a first profile and a second profile, and the first profile is in an enabled state. After initializing the eUICC, the terminal stores data of the first profile in a cache of the terminal, and accesses a network using the first profile.

Further, the profile data stored in the cache of the terminal herein is not all data of the profile, but only some data of the profile, for example, a file under a master file (MF) in a file system of the profile and data generated during initialization of an NAA of the profile. Moreover, in practical application, in addition to caching the data of the first profile, the terminal also generates and caches some data related to the first profile, for example, an encryption key in a communication process.

Then, the terminal initiates enabling of the second profile, and sends the enable instruction to the eUICC. The enable instruction may be an enhanced profile enable command, which is used to control states of profiles, that is, to switch between profiles.

During specific implementation, that the terminal initiates enabling of the second profile may include after the second profile is installed, a user initiates, on a user interface, a second profile enabling process. Alternatively, the terminal initiates, upon startup, enabling of the second profile that exists in the eUICC and that is not yet enabled.

Optionally, in practical application, before sending the second profile enable instruction to the eUICC, the terminal needs to determine whether a high-priority service (for example, a call) interacting with the first profile is currently going on. The terminal sends the second profile enable instruction to the eUICC only when there is no such service going on.

Step 202: The eUICC disables a first profile and enables a second profile according to the enable instruction.

After receiving the enable instruction sent by the terminal, the eUICC disables the first profile and enables the second profile. A specific manner of disabling a profile and enabling a profile is to change states of the profiles. For example, when a state machine of a profile is set to 1, the profile is in an enabled state, and the terminal can read data of the profile, when a state machine of a profile is set to 0, the profile is in a disabled state, and the terminal cannot read data of the profile.

Step 203: The eUICC sends a first instruction to the terminal according to the enable instruction, and the terminal receives the first instruction sent by the eUICC.

In step 201, the enable instruction sent by the terminal to the eUICC carries a special indication parameter. When the eUICC supports a single card dual standby function of the present disclosure, the eUICC sends the first instruction to the terminal according to the special indication parameter to instruct the terminal not to restart the eUICC, that is, not to re-initialize the eUICC.

Optionally, in a specific implementation, the profile enable instruction may be a set status command or a store data command in the other approaches. Based on this, the other approaches set status command or store data command is extended to include the special indication parameter. This indication parameter is used to indicate that the set status command or the store data command is a specific command different from the other approaches command, such that the eUICC, after receiving the command, needs to execute specific logic such as sending to the terminal the first instruction indicating that the eUICC does not need to be restarted.

Further, in a specific implementation, a message is returned when the eUICC is powered on and negotiates a communications protocol with the terminal. The message includes a capability that the eUICC supports the profile switching method (that is, the single card dual standby feature) of the present disclosure, such that the terminal sends the enable instruction including the special parameter to the eUICC.

Further, the message returned to the terminal by the eUICC upon power-on may be an optimization based on an ATR message in the other approaches, and a parameter is added to the ATR message to indicate that the eUICC supports the profile switching method (that is, the single card dual standby feature) of the present disclosure. A specific manner may be extending the ATR message to include a T4 field (a value of card capabilities).

Further, in a specific implementation, the first instruction sent by the eUICC may be a refresh command redefined based on the other approaches. The command carries a new mode, instructing the terminal that the eUICC does not need to be restarted.

Step 204: According to the first instruction, the terminal retains data of the first profile stored in a cache, and stores data of the second profile in the cache.

After receiving the first instruction sent by the eUICC, the terminal does not restart the eUICC, and retains the data of the first profile stored in the cache. Using this data, the terminal may still camp on a network to which the first profile belongs. The terminal initiates a second profile initialization process, reads related data of the second profile, and caches the data in the cache.

Similarly, the terminal does not read all data of the second profile, but only some data of the profile, for example, a file under an MF in a file system of the profile and data generated during initialization of an NAA of the profile. Moreover, in practical application, in addition to caching the data of the first profile, the terminal also generates and caches some data related to the first profile, for example, an encryption key in a communication process.

In addition, it should be noted that the data of the first profile and the data of the second profile are stored separate from each other in the cache of the terminal.

Step 205: The terminal accesses a network using the second profile.

After storing the data of the second profile in the cache, the terminal completes network authentication using the second profile, and attaches to the network using the second profile.

In this embodiment of the present disclosure, the terminal sends the enable instruction to the eUICC such that the eUICC disables the first profile and enables the second profile and sends the first instruction to the terminal, where the instruction instructs the terminal not to restart the eUICC. After receiving the first instruction, the terminal does not restart the eUICC, retains the data of the first profile stored in the cache, and stores the data of the second profile in the cache such that the terminal may access the network using the second profile. In this embodiment of the present disclosure, the eUICC initialization process is optimized such that the terminal does not restart the eUICC after a profile switch, but still retains data of a before-switching profile and camps, using this data, on a network to which the before-switching profile belongs, and may also access a network using an after-switching profile. In this way, quick switching between profiles can be implemented, and a single card dual standby effect can be achieved.

Further, both the data of the first profile and the data of the second profile are stored in the cache of the terminal. Based on simultaneous camping on the network to which the first profile belongs and the network to which the second profile belongs, the terminal can implement quick alternate switches between two profiles using profile switch instructions to implement switching between connecting the first profile and connecting the second profile. Details are described below.

Figure 3:
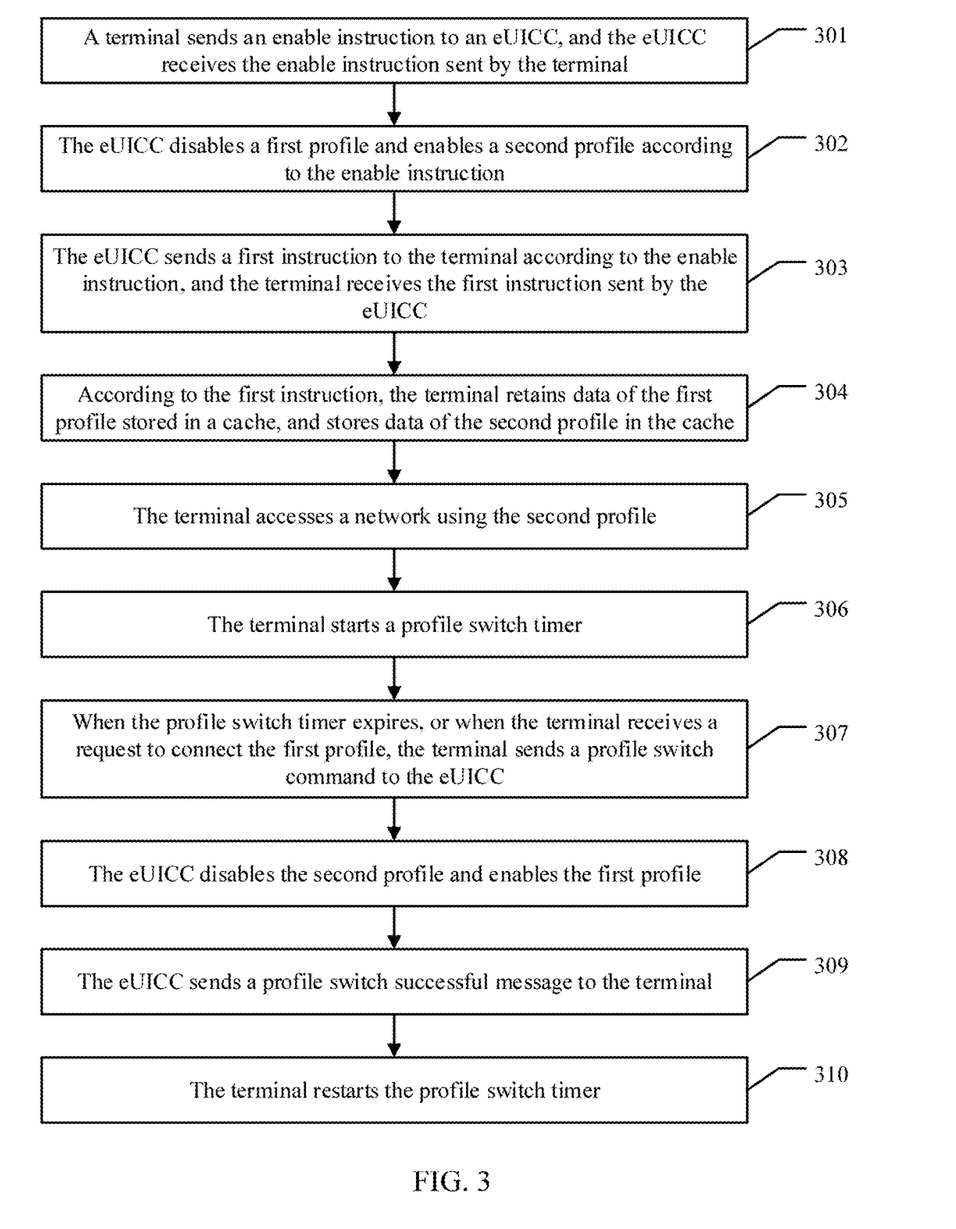
FIG. 3 is another flowchart of a profile switching method according to an embodiment of the present disclosure.

Before switching, the first profile and the second profile need to be first initialized so that the data of the first profile and the data of the second profile are stored in the cache. A specific process is the same as that in the embodiment shown in FIG. 2, that is, step 301 to step 305 are the same as step 201 to step 205, and details are not repeated herein.

Step 306: The terminal starts a profile switch timer.

After caching the data of the first profile, the terminal starts the profile switch timer. Alternatively, the terminal may start the profile switch timer after determining that the terminal has accessed the network to which the second profile belongs using the second profile.

Step 307: When the profile switch timer expires, or when the terminal receives a request to connect the first profile, the terminal sends a profile switch command to the eUICC.

When the profile switch timer expires, the terminal initiates a profile switch process, and sends the profile switch command to the eUICC.

Alternatively, when the terminal receives, before the timer expires, the request to connect the first profile (for example, an incoming call request or an outgoing call request), the terminal sends the profile switch command to the eUICC.

Optionally, in practical application, when receiving the request to connect the first profile, the terminal does not send the profile switch command to the eUICC immediately, but needs to determine whether a service interacting with the second profile is currently going on. If there is no such service going on, the terminal sends the profile switch command to the eUICC.

Optionally, the switch command may include a local switch or profile switch command.

Step 308: The eUICC disables the second profile and enables the first profile.

After receiving the profile switch command sent by the terminal, the eUICC disables the second profile that is currently in an enabled state, and enables the first profile that is currently in a disabled state.

A specific manner of disabling a profile and enabling a profile is to change states of the profiles. For example, when a state machine of a profile is set to 1, the profile is in an enabled state, and the terminal can read data of the profile, when a state machine of a profile is set to 0, the profile is in a disabled state, and the terminal cannot read data of the profile.

Step 309: The eUICC sends a profile switch successful message to the terminal.

The eUICC disables the second profile and enables the first profile, and sends the profile switch successful message to the terminal such that the terminal may switch from connecting the second profile to connecting the first profile.

Step 310: The terminal restarts the profile switch timer.

At the same time when receiving the profile switch successful message sent by the eUICC, the terminal restarts the profile switch timer to continue to switch between the first profile and the second profile in a timed manner.

The following uses a specific application scenario as an example to describe the profile switching method in this embodiment of the present disclosure.

Figure 4:
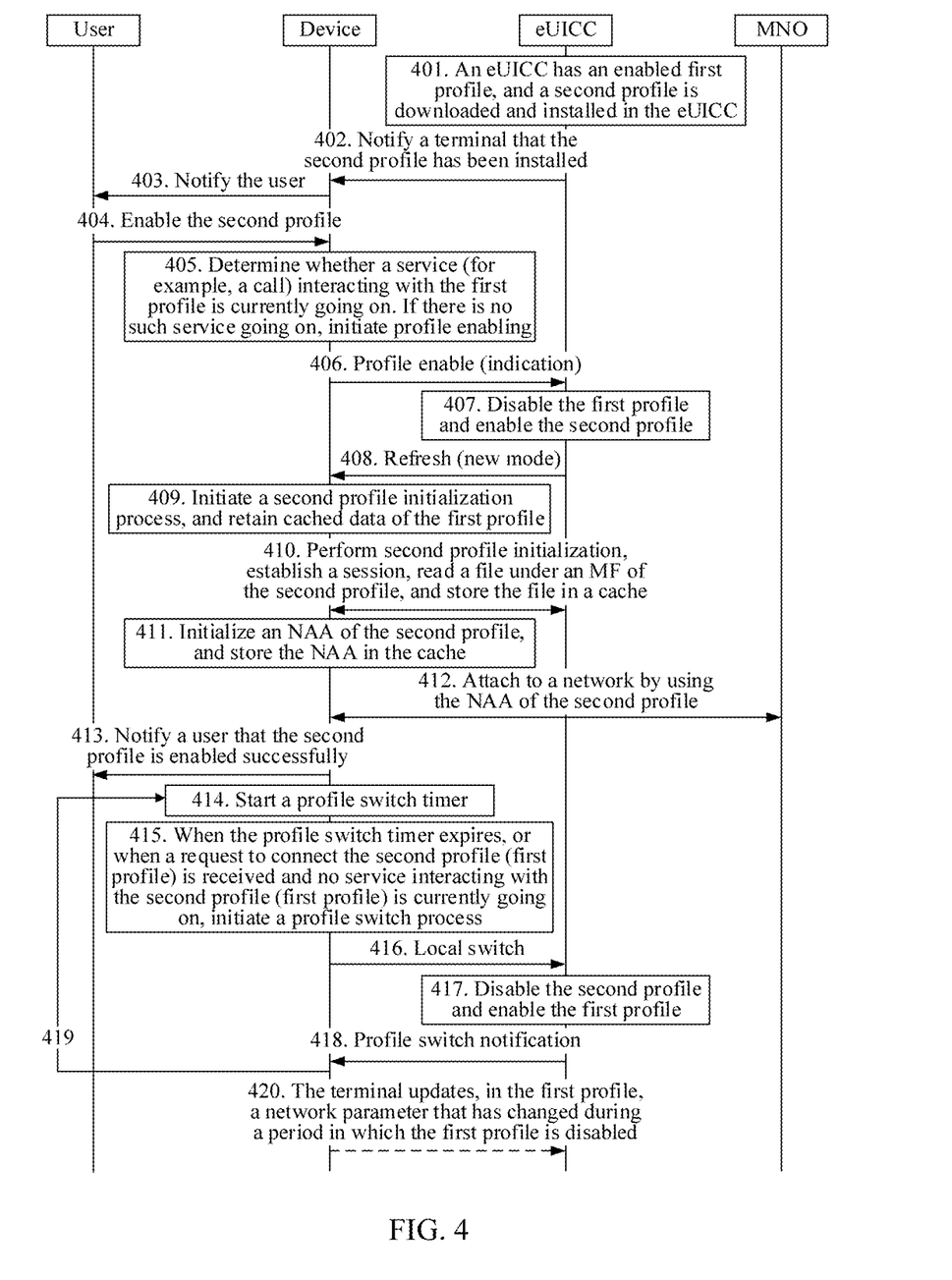
FIG. 4 is a flowchart of information exchange between a terminal and an eUICC according to an embodiment of the present disclosure.

With reference to FIG. 4, this embodiment of the present disclosure is applicable to a scenario in which the terminal has been started, originally there is only one profile in the eUICC, where the profile is in an enabled state, and then a user downloads a new profile.

Step 401: The eUICC has an enabled first profile, and a second profile is downloaded and installed in the eUICC.

Step 402: The eUICC notifies the terminal that the second profile has been installed.

Step 403: The terminal notifies the user on a user interface (UI) that the second profile has been installed.

Step 404: The user chooses to enable the second profile.

Step 405: The terminal determines whether a service (for example, a call) interacting with the first profile is currently going on. If there is no such service going on, the terminal initiates profile enabling.

Step 406: The terminal sends to the eUICC a profile enable command (indication) for profile enabling.

Optionally, the profile enable command may be an optimization based on a set status command or a store data command in the other approaches to indicate that the set status command or the store data command is a specific command different from the other approaches command. After receiving the command, the eUICC needs to execute specific logic such as sending to the terminal a first instruction indicating that the eUICC does not need to be restarted.

Using the set status command as an example, Table 1 shows parameters of the other approaches command.

TABLE 1

| Code | Value | Meaning |
|---|---|---|
| CLA | '80'-'8F', 'C0'-"CF' or 'E0'-"EF' | See section 11.1.4 |
| INS | 'F0' | SET STATUS |
| P1 | 'xx' | Status type |
| P2 | 'xx' | State control |
| Lc | 'xx' | Length of data field |
| Data | 'xxxxx . . . ' | Application identifier (AID) of Application (and media access control (MAC) if present) |
| Le | | Not present |

P1 is encoded as follows:

TABLE 2

| b8 | b7 | b6 | b5 | b4 | b3 | b2 | b1 | Meaning |
|---|---|---|---|---|---|---|---|---|
| 1 | 0 | 0 | — | — | — | — | — | Indicate Issuer Security Domain |
| 0 | 1 | 0 | — | — | — | — | — | Indicate Application or Supplementary Security Domain |
| 0 | 1 | 1 | — | — | — | — | — | Indicate Security Domain and its associated Applications |
| — | — | — | X | X | X | X | X | Reserved for future use (RFU) |

In this embodiment of the present disclosure, b5 to b1 that are not defined may be used to indicate that the set status command is a specific command different from the other approaches command.

Alternatively, an indication may be added to another field (for example, a data field) in the set status command, to indicate that the set status command is a specific command different from the other approaches command.

Step 407: The eUICC disables the first profile and enables the second profile.

Step 408: The eUICC sends a first instruction (for example, a refresh command, where the command carries a new mode) to the terminal, instructing the terminal not to restart the UICC card.

Step 409: After receiving the first instruction, the terminal retains data of the first profile in a cache, and initiates a second profile initialization process.

Step 410: The terminal opens a new logical channel, establishes a new session session, reads a file under an MF in a file system of the second profile, and stores the file in the cache.

Step 411: The terminal initializes an NAA in the second profile, and stores the NAA in the cache.

Step 412: The terminal accesses a network using the NAA of the second profile.

Step 413: The terminal notifies the user on the UI that the profile is enabled successfully.

Step 414: The terminal starts a profile switch timer.

Step 415: When the profile switch timer expires, or when a request to connect the first profile (for example, a call request) is received and no service interacting with the second profile is currently going on, initiate a process of switching to the first profile.

Step 416: The terminal sends a local switch command.

Step 417: The eUICC disables the second profile and enables the first profile.

Step 418: The eUICC sends a profile switch successful indication to the terminal.

Step 419: The terminal restarts the profile switch timer, and performs a next switch when the timer expires again, and switching goes so on cyclically.

Step 420: The terminal updates, in the first profile, a network parameter that has changed on a network to which the first profile belongs (for example, a location area update event has occurred on the network to which the first profile belongs).

It should be noted that the update of network data of the first profile (or the second profile) may be a timed update, an event-triggered update, or an update performed during shutdown of the terminal. An update mechanism is not limited in this embodiment of the present disclosure.

Herein the network parameter that has changed on the network to which the first profile belongs may be a network parameter that has changed since a previous update time, instead of only a network parameter that has changed during a period in which the first profile is disabled and the second profile is used.

For switching between two profiles, one profile may be set as a primary card and the other set as a secondary card. The following describes with reference to FIG. 5 an application scenario for setting a primary card and a secondary card.

Figure 5:
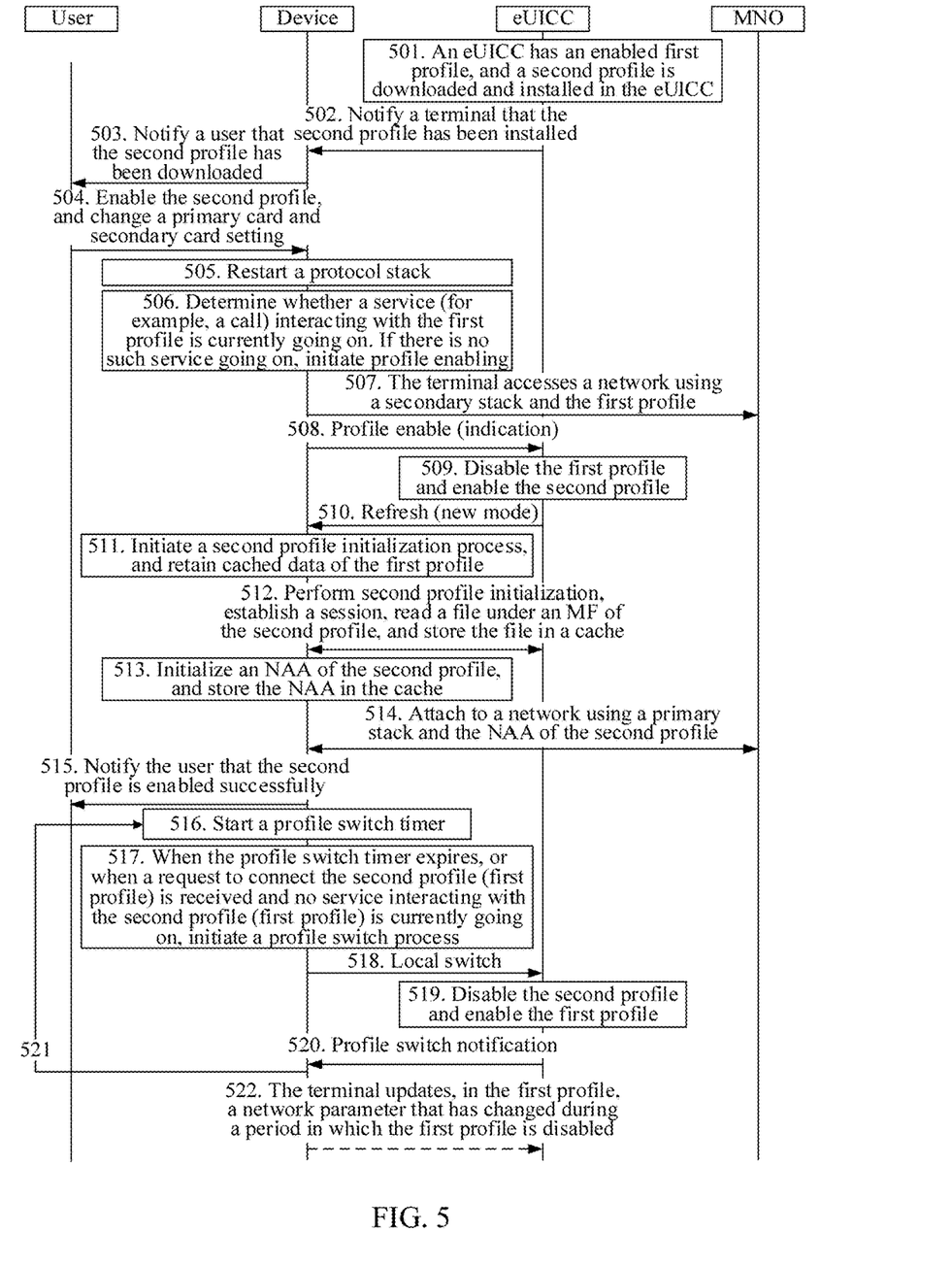
FIG. 5 is another flowchart of information exchange between a terminal and an eUICC according to an embodiment of the present disclosure.

This embodiment of the present disclosure is applicable to a scenario in which the terminal has been started, originally there is only one profile in the eUICC, where the profile is in an enabled state, then a user downloads a new profile, and the user sets the downloaded new profile as a primary card and the original profile as a secondary card.

Step 501: The eUICC has an enabled first profile, and a second profile is downloaded and installed in the eUICC.

Step 502: The eUICC notifies the terminal that the second profile has been installed.

Step 503: The terminal notifies the user on a UI that the second profile has been installed.

Step 504: The user chooses to enable the second profile, and changes a primary card and secondary card setting.

Step 505: The terminal restarts a protocol stack.

Step 506: The terminal determines whether a service (for example, a call) interacting with the first profile is currently going on. If there is no such service going on, the terminal initiates profile enabling.

Step 507: The terminal accesses a network using a secondary stack and the first profile.

Step 508: The terminal sends to the eUICC a profile enable command for profile enabling.

A specific optional profile enable command is the same as that described in the embodiment shown in FIG. 5, and details are not repeated herein.

Step 509: The eUICC disables the first profile and enables the second profile.

Step 510: The eUICC sends a first instruction (for example, a refresh command, where the command carries a new mode) to the terminal, instructing the terminal not to restart the UICC card.

Step 511: After receiving the first instruction, the terminal retains data of the first profile in a cache, and initiates a second profile initialization process.

Step 512: The terminal opens a new logical channel, establishes a new session, reads a file under an MF in a file system of the second profile, and stores the file in the cache.

Step 513: The terminal initializes an NAA in the second profile, and stores the NAA in the cache.

Step 514: The terminal accesses a network using a primary stack and the NAA of the second profile.

Step 515: The terminal notifies the user on the UI that the profile is enabled successfully.

Step 516 to step 522 are the same as step 414 to step 420 in the embodiment shown in FIG. 4, and details are not repeated herein.

It should be noted that, in this embodiment of the present disclosure, an example in which the newly installed second profile is used as the primary card and the originally enabled first profile is used as the secondary card is used to describe the primary card and secondary card setting. In addition to this, the user may further proactively initiate a change to the primary card and secondary card setting in another scenario. A profile set as the primary card accesses a network using the primary stack, and a profile set as the secondary card accesses a network using the secondary stack.

The foregoing describes the profile switching method based on a scenario in which a new profile is downloaded and installed in the eUICC. The following describes the profile switching method with reference to FIG. 6 based on an application scenario in which two profiles have been installed in the eUICC and a user starts the terminal normally.

Figure 6:
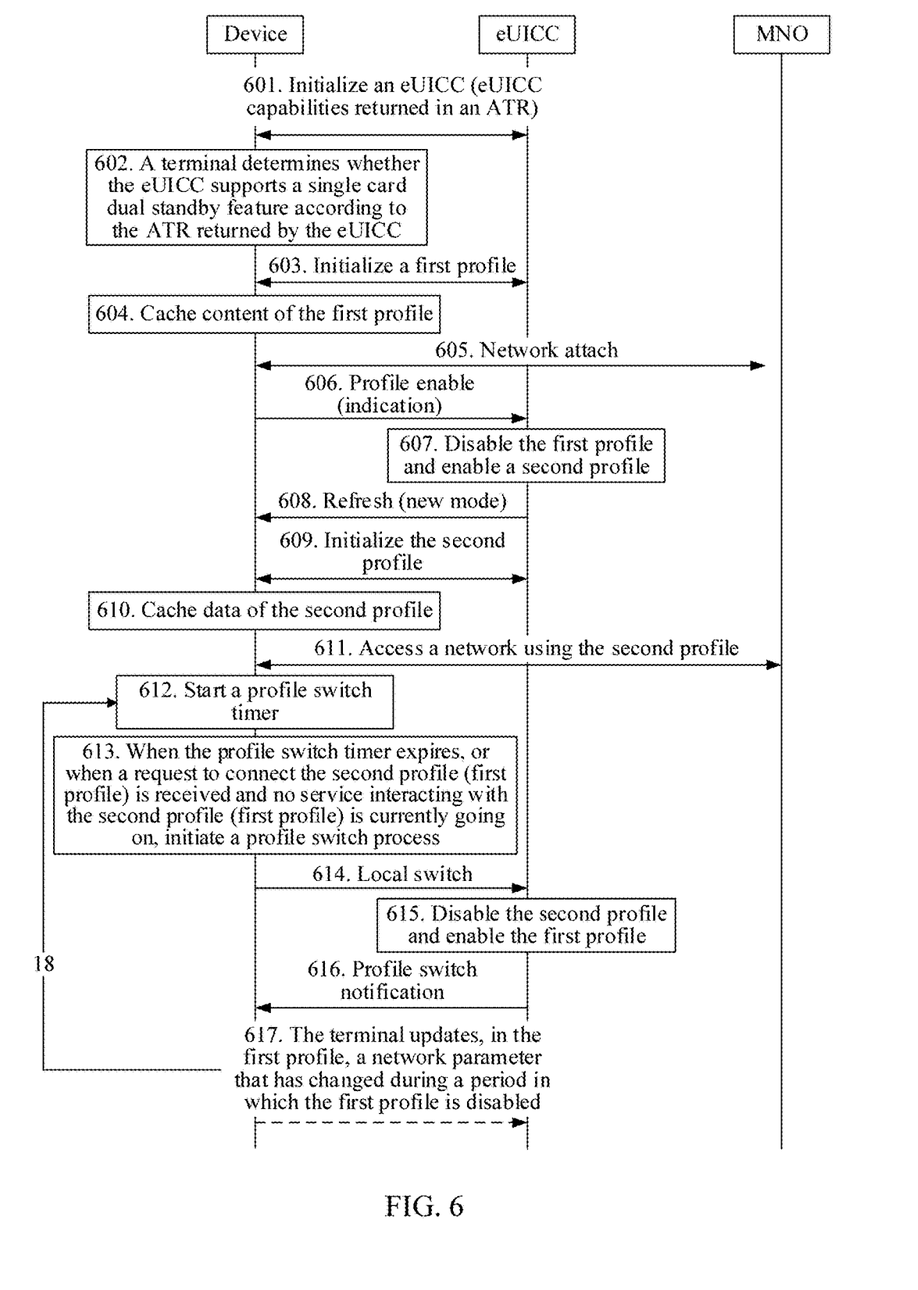
FIG. 6 is another flowchart of information exchange between a terminal and an eUICC according to an embodiment of the present disclosure.

If the eUICC has more than two profiles, it is assumed that the user has chosen to use a first profile and a second profile before the terminal is shut down. Therefore, another profile is not enabled after the terminal is started.

Step 601: The terminal is started, and initiates a normal eUICC initialization process. The eUICC is powered on, and the eUICC returns an ATR message to the terminal.

The ATR message includes a series of capabilities supported by the eUICC, and the terminal negotiates, for example, a commutations protocol with the eUICC based on the message.

In this embodiment of the present disclosure, an optimization is made based on an ATR parameter, and a parameter is added to the ATR message to indicate that the eUICC supports the profile switching method (that is, a single card dual standby feature) of the present disclosure. A specific manner may be extending the ATR message to include a T4 field (a value of card capabilities).

Step 602: The terminal obtains capabilities supported by the eUICC from the ATR, and determines whether single card dual standby is supported.

Step 603: The terminal initiates a first profile initialization process.

Step 604: The terminal obtains data of the first profile from the eUICC, and stores the data of the first profile in a cache.

Step 605: The terminal accesses a network using the first profile.

Step 606: The terminal sends a profile enable command to the eUICC.

A specific optional profile enable command is the same as that described in the embodiment shown in FIG. 5, and details are not repeated herein.

Step 607: The eUICC disables the first profile and enables the second profile.

Step 608: The eUICC sends a first instruction (for example, a refresh command, where the command carries a new mode) to the terminal, instructing the terminal not to restart the UICC card.

Step 609: The terminal opens a new logical channel, establishes a new session, and executes a second profile initialization process.

Step 610: The terminal caches data of the second profile.

Further, the terminal reads a file under an MF in a file system of the second profile, stores the file in the cache, initializes an NAA in the second profile, and stores the NAA in the cache.

Step 611: The terminal accesses a network using the second profile.

Step 612 to step 618 are the same as step 414 to step 420 in the embodiment shown in FIG. 4, and details are not repeated herein.

Figure 7:
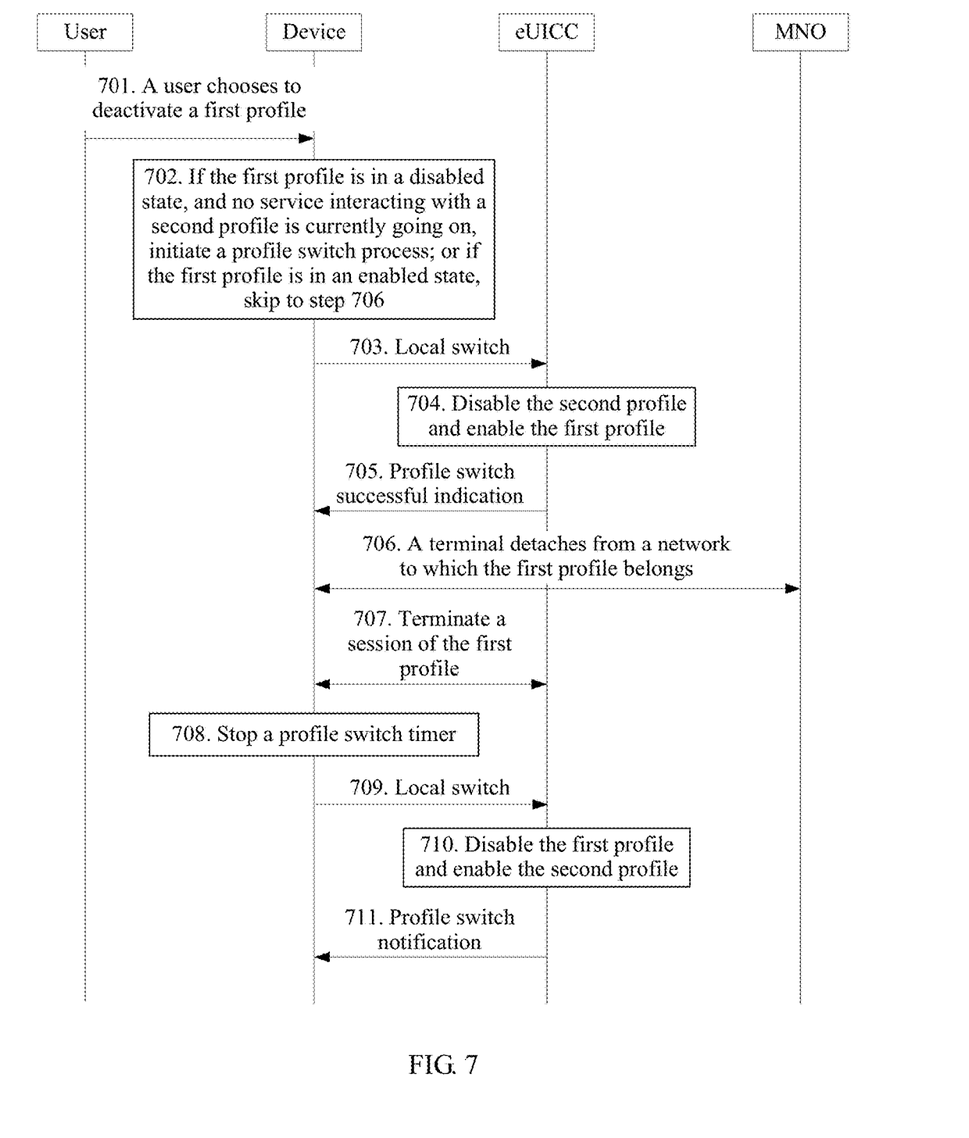
FIG. 7 is another flowchart of information exchange between a terminal and an eUICC according to an embodiment of the present disclosure.

The following describes, with reference to FIG. 7, a process in which a user deactivates one profile when switching is performed between a first profile and a second profile.

It should be noted that, deactivating one profile herein indicates disabling the profile and stopping profile switching such that the profile remains in a disabled state until the user proactively restores enabling of the profile (that is, proactively re-enabling the profile).

The following uses deactivating the first profile as an example for description.

Step 701: The user chooses to deactivate the first profile on a dual card management interface.

Step 702: If the first profile is in a disabled state, the first profile needs to be enabled first. When determining that no service interacting with the second profile is currently going on, the terminal initiates a profile switch process. If the first profile is in an enabled state, step 706 is directly performed.

Step 703: The terminal sends a local switch command to the eUICC.

Step 704: The eUICC disables the second profile and enables the first profile.

Step 705: The eUICC sends a profile switch successful indication to the terminal.

Step 706: The terminal detaches from a network to which the first profile belongs.

After the terminal detaches from the network to which the first profile belongs, a service interacting with the first profile is terminated, and service interaction cannot be performed using the first profile.

Step 707: The terminal closes a session channel for interacting with the first profile.

Step 708: The terminal stops a profile switch timer to stop timed switching between profiles.

Step 709: The terminal sends a local switch command to the eUICC.

Step 710: After receiving the local switch command, the eUICC disables the first profile and enables the second profile.

Step 711: The eUICC sends a profile switch successful indication to the terminal.

After receiving the indication, the terminal connects the second profile. At this time, the eUICC successfully deactivates the first profile, and switching between profiles is not performed any more.

Figure 8:
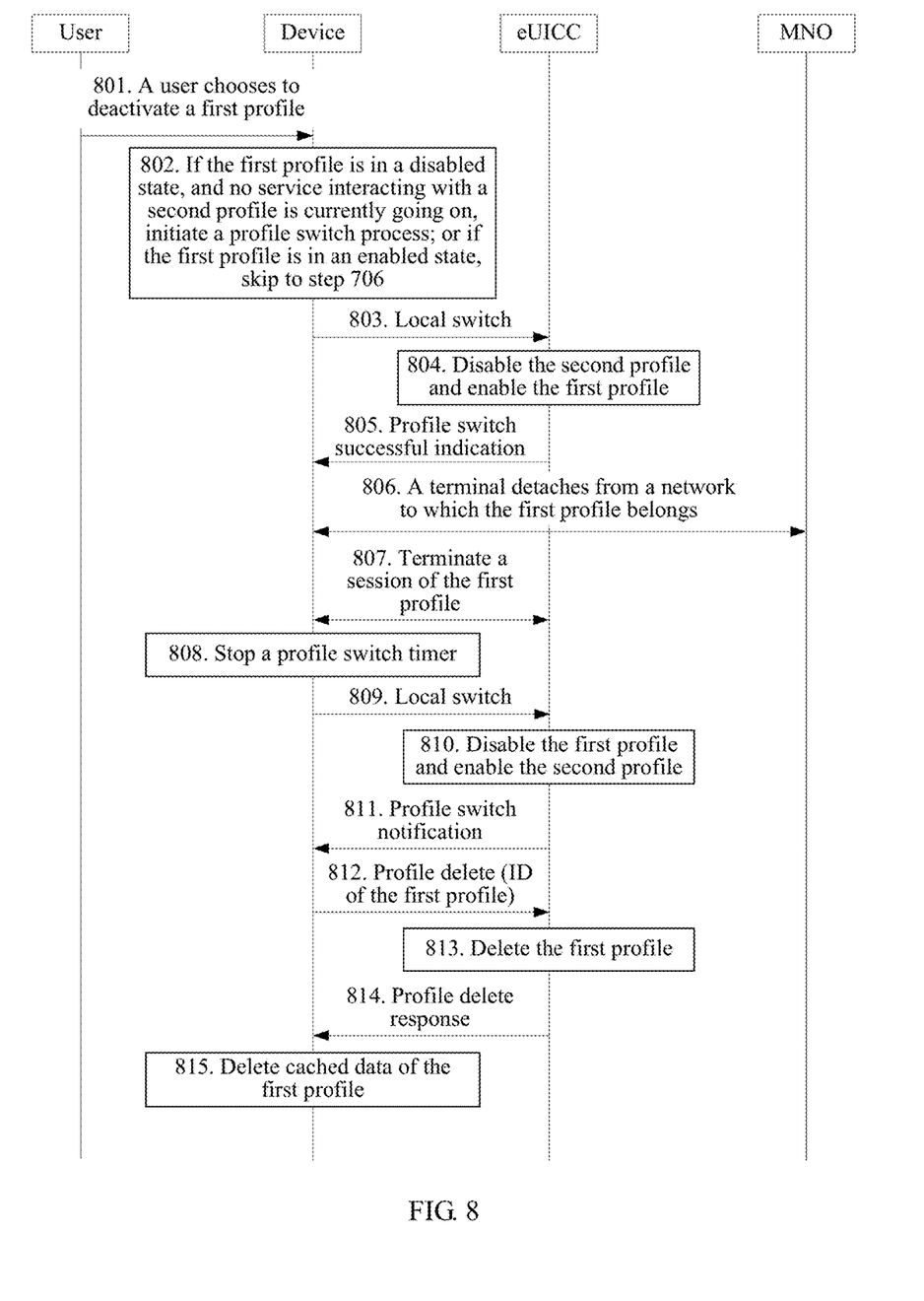
FIG. 8 is another flowchart of information exchange between a terminal and an eUICC according to an embodiment of the present disclosure.

The following describes, with reference to FIG. 8, a process in which a user deletes one profile when switching is performed between a first profile and a second profile. The following uses deleting the first profile as an example for description.

Before a profile is deleted, the to-be-deleted target profile needs to be deactivated first. Step 801 to step 811 are steps for deactivating the first profile, same as step 701 to step 711 in the embodiment shown in FIG. 7. Details are not repeated herein.

Step 812: The terminal sends an instruction to delete the first profile to the eUICC.

Further, the terminal may send a profile delete instruction to the eUICC, and the instruction carries a profile identifier of the first profile or an AID of an ISD-P that stores the first profile.

Step 813: The eUICC deletes the first profile.

After receiving the instruction to delete the first profile, the eUICC deletes the first profile that has been downloaded and installed.

Step 814: The eUICC returns a response to the terminal.

After deleting the first profile, the eUICC returns a deletion success response to the terminal.

Step 815: The terminal deletes cached data of the first profile.

The foregoing describes the profile switching method. The following describes the terminal of the present disclosure from a perspective of hardware structure processing.

The terminal in the embodiments of the present disclosure may be a smartphone, a tablet computer, an Internet of Things terminal device, or a terminal device such as a handheld device with a wireless communication function, an in-vehicle device, a wearable device, or a computing device.

In the embodiments of the present disclosure, generally, an eUICC is embedded in a terminal device by means of packaging or welding, and sold as a part of the terminal device. Therefore, the following considers the eUICC as a part of the terminal device and describes the terminal including the eUICC.

Figure 9:
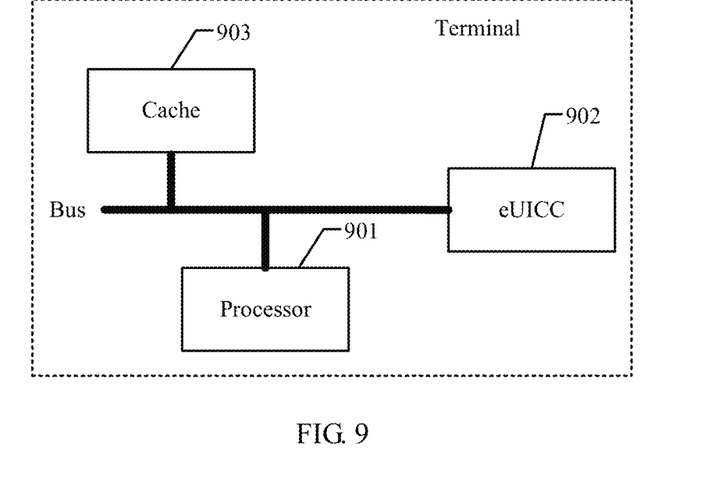
FIG. 9 is a schematic structural diagram of a terminal according to an embodiment of the present disclosure.

With reference to FIG. 9, an embodiment of the present disclosure provides a terminal. The terminal includes a processor 901, an eUICC 902, and a cache 903.

It should be noted that, for the terminal in this embodiment of the present disclosure, only a structure related to the present disclosure is described. In practical application, in addition to the processor 901, the eUICC 902, and the cache 903, the terminal further includes a hardware device such as a memory, a radio frequency transmitter, or a monitor. Other hardware devices outside the scope of the present disclosure are not described herein.

In this embodiment of the present disclosure, the processor 901 is configured to send an enable instruction to the eUICC 902, the eUICC 902 includes at least a first profile and a second profile, data of the first profile is stored in the cache 903, and the terminal has accessed a network using the first profile.

The eUICC 902 is configured to disable the first profile and enable the second profile according to the enable instruction, and send a first instruction to the processor 901, where the first instruction is used to instruct the processor 901 not to restart the eUICC 902.

The processor 901 is further configured to, according to the first instruction, retain the data of the first profile stored in the cache 903, and store data of the second profile in the cache 903 such that the terminal accesses a network using the second profile.

Further, that the terminal accesses a network using the second profile is further that the processor 901 performs computation according to the data of the second profile in the cache 903, completes network authentication, and accesses the network to which the second profile belongs using an radio frequency module. Specific interaction with another module in the terminal device during network access is the other approaches, and details are not provided herein.

In addition, it should be noted that the data of the first profile and the data of the second profile are stored separate from each other in the cache of the terminal.

For a process of interaction between the processor 901, the eUICC 902, and the cache 903 of the terminal in this embodiment of the present disclosure, refer to the interaction process in the foregoing embodiment shown in FIG. 2. Details are not repeated herein.

In this embodiment of the present disclosure, the processor 901 sends the enable instruction to the eUICC 902 such that the eUICC 902 disables the first profile and enables the second profile. The eUICC 902 sends the first instruction to the processor 901, where the instruction instructs the processor 901 not to restart the eUICC 902. After receiving the first instruction, the processor 901 does not restart the eUICC 902, retains the data of the first profile stored in the cache 903, and stores the data of the second profile in the cache 903. Then the processor 901 accesses the network using the second profile. In this embodiment of the present disclosure, eUICC 902 initialization process is optimized such that the processor 901 does not restart the eUICC 902 after a profile switch, but still retains data of a before-switching profile and camps, using this data, on a network to which the before-switching profile belongs, and may also access a network using an after-switching profile. In this way, quick switching between profiles can be implemented, and a single card dual standby effect can be achieved.

The processor 901 is further configured to send a profile switch command to the eUICC 902, and the eUICC 902 is further configured to disable the second profile and enable the first profile after receiving the profile switch command, and send a profile switch successful message to the processor 901 such that the processor 901 may connect the first profile.

In some implementations, the processor 901 is further configured to send the profile switch command to the eUICC 902 when receiving a request to connect the first profile.

In some implementations, the processor 901 is further configured to send the profile switch command to the eUICC 902, when receiving the request to connect the first profile and no service interacting with the second profile is currently going on.

In some implementations, the processor 901 is further configured to start a profile switch timer, send the profile switch command to the eUICC 902 when the profile switch timer expires, and restart the profile switch timer after receiving the profile switch successful message.

In some implementations, the eUICC 902 is further configured to send an ATR message to the processor 901, where the ATR message includes a first indication parameter, and the processor 901 is further configured to send the profile enable instruction to the eUICC 902 according to the first indication parameter.

In some implementations, the processor 901 is further configured to send the profile enable instruction to the eUICC 902, where the profile enable instruction is a set status command or a store data command, and the profile enable instruction includes a second indication parameter, and the eUICC 902 is further configured to send the first instruction to the processor 901 according to the second indication parameter.

For a process of interaction between the processor 901, the eUICC 902, and the cache 903 of the terminal in this embodiment of the present disclosure, refer to the interaction process in the foregoing embodiment shown in FIG. 3. Details are not repeated herein.

In addition, in some implementations, the processor 901 is further configured to receive an instruction to deactivate a first target profile, detach the terminal from a network to which the first target profile belongs, and stop the profile switch timer, where the first target profile is one of the first profile or the second profile.

For a specific process of interaction between the processor 901 and the eUICC 902 during profile deactivation, refer to the interaction process in the foregoing embodiment shown in FIG. 7. Details are not repeated herein.

In some implementations, the processor 901 is further configured to receive an instruction to delete a second target profile, detach the terminal from a network to which the second target profile belongs, stop the profile switch timer, and send an instruction to delete the second target profile to the eUICC 902, where the second target profile is one of the first profile or the second profile, the eUICC 902 is further configured to delete the second target profile after receiving the instruction sent by the processor 901 to delete the second target profile, and the processor 901 is further configured to delete data of the second target profile from the cache 903.

For a specific process of interaction between the processor 901 and the eUICC 902 during profile deletion, refer to the interaction process in the foregoing embodiment shown in FIG. 8. Details are not repeated herein.

In the foregoing embodiments, the descriptions of the embodiments each have a respective focus. For a part that is not described in detail in an embodiment, refer to related descriptions in other embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses or units, and may be implemented in electrical, mechanical, or other forms.

The units described as separate parts may or may not be physically separate. Parts displayed as units may or may not be physical units, and may be located in one position or distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The description about the foregoing embodiments is merely provided to help understand the method and core ideas of the present disclosure. In addition, a person of ordinary skill in the art can make variations and modifications to the present disclosure in terms of specific implementations and application scopes according to the ideas of the present disclosure. Therefore, content of this specification shall not be construed as a limitation on the present disclosure.

What is claimed is:

1. A user profile switching method, comprising:
sending, by a terminal, a profile enable instruction to an embedded universal integrated circuit card (eUICC) comprising at least a first profile and a second profile, data of the first profile being stored in a cache of the terminal, the terminal having accessed a network using the first profile, and the profile enable instruction instructing the eUICC to disable the first profile and enable the second profile;
receiving, by the terminal, a first instruction from the eUICC, the first instruction comprising a response of the eUICC to the profile enable instruction that instructs the terminal to not to restart the eUICC;
retaining, by the terminal according to the first instruction, the data of the first profile stored in the cache;
storing, by the terminal according to the first instruction, data of the second profile in the cache; and
accessing, by the terminal, the network using the second profile.

2. The method according to claim 1, further comprising:
sending, by the terminal, a profile switch command to the eUICC to disable the second profile and enable the first profile; and
receiving, by the terminal, a profile switch successful message from the eUICC.

3. The method according to claim 2, wherein sending the profile switch command to the eUICC comprises sending, by the terminal, the profile switch command to the eUICC when the terminal receives a request to couple the first profile.

4. The method according to claim 3, wherein sending the profile switch command to the eUICC comprises sending, by the terminal, the profile switch command to the eUICC when the terminal receives the request to couple the first profile and no service interacting with the second profile exist.

5. The method according to claim 2, further comprising starting, by the terminal, a profile switch timer, sending the profile switch command to the eUICC comprises sending, by the terminal, the profile switch command to the eUICC when the profile switch timer expires, and after receiving the profile switch successful message from the eUICC, and the method further comprises restarting, by the terminal, the profile switch timer.

6. The method according to claim 5, further comprising:
receiving, by the terminal, an instruction to deactivate a first target profile that is part of one of the first profile or the second profile;
detaching, by the terminal, from a network to which the first target profile belongs; and
stopping, by the terminal, the profile switch timer.

7. The method according to claim 5, further comprising:
receiving, by the terminal, an instruction to delete a second target profile that is part of one of the first profile or the second profile;
detaching, by the terminal, from a network to which the second target profile belongs;
stopping, by the terminal, the profile switch timer;

sending, by the terminal, the instruction to delete the second target profile to the eUICC; and deleting, by the terminal, data of the second target profile from the cache.

8. The method according to claim 1, further comprising receiving, by the terminal, an answer to reset (ATR) message from the eUICC, the ATR message comprising a first indication parameter, and sending the profile enable instruction to the eUICC comprises sending, by the terminal, the profile enable instruction to the eUICC according to the first indication parameter.

9. The method according to claim 1, wherein the profile enable instruction comprises a set status command and a second indication parameter that causes the eUICC to send, according to the second indication parameter, the first instruction to the terminal.

10. The method according to claim 1, wherein the profile enable instruction comprises a store data command and a second indication parameter that causes the eUICC to send, according to the second indication parameter, the first instruction to the terminal.

11. A terminal, comprising:
a cache;
an embedded universal integrated circuit card (eUICC) coupled to the cache and comprising at least a first profile and a second profile, data of the first profile being stored in the cache, and the terminal having accessed a network using the first profile;
a processor coupled to the eUICC and the cache and configured to send a profile enable instruction to the eUICC,
wherein the eUICC is configured to:
disable the first profile and enable the second profile according to the profile enable instruction; and
send a first instruction to the processor, instructing the processor to not to restart the eUICC, and
wherein the processor is further configured to:
retain the data of the first profile stored in the cache according to the first instruction; and
store data of the second profile in the cache to let the terminal to accesses the network using the second profile.

12. The terminal according to claim 11, wherein the processor is further configured to send a profile switch command to the eUICC, and the eUICC is further configured to:
disable the second profile and enable the first profile after receiving the profile switch command; and
send a profile switch successful message to the processor.

13. The terminal according to claim 12, wherein the processor is further configured to send the profile switch command to the eUICC when receiving a request to couple the first profile.

14. The terminal according to claim 13, wherein the processor is further configured to send the profile switch command to the eUICC when receiving the request to couple the first profile and no service interacting with the second profile exist.

15. The terminal according to claim 12, wherein the processor is further configured to:
start a profile switch timer;
send the profile switch command to the eUICC when the profile switch timer expires; and
restart the profile switch timer after receiving the profile switch successful message.

16. The terminal according to claim 15, wherein the processor is further configured to:
receive an instruction to deactivate a first target profile that is part of one of the first profile or the second profile;
detach the terminal from a network to which the first target profile belongs; and
stop the profile switch timer.

17. The terminal according to claim 15, wherein the processor is further configured to:
receive an instruction to delete a second target profile that is part of one of the first profile or the second profile;
detach the terminal from a network to which the second target profile belongs;
stop the profile switch timer; and
send the instruction to delete the second target profile to the eUICC,
wherein the eUICC is further configured to delete the second target profile after receiving the instruction from the processor to delete the second target profile, and
wherein the processor is further configured to delete data of the second target profile from the cache.

18. The terminal according to claim 11, wherein the eUICC is further configured to send an answer to reset (ATR) message to the processor, comprising a first indication parameter, and the processor is further configured to send the profile enable instruction to the eUICC according to the first indication parameter.

19. The terminal according to claim 11, wherein the processor is further configured to send the profile enable instruction to the eUICC, comprising a set status command and a second indication parameter, and the eUICC is further configured to send the first instruction to the processor according to the second indication parameter.

20. The terminal according to claim 11, wherein the processor is further configured to send the profile enable instruction to the eUICC, comprising a store data command and a second indication parameter, and the eUICC is further configured to send the first instruction to the processor according to the second indication parameter.

* * * * *